Aug. 7, 1951     C. SCHINDLER     2,563,136
SYSTEM OF PROTECTION FOR POWER LINES
Original Filed Sept. 7, 1944     5 Sheets-Sheet 1

INVENTOR.
CARL SCHINDLER
BY
Andrew R. Woolfolk
ATTORNEY

Aug. 7, 1951  C. SCHINDLER  2,563,136
SYSTEM OF PROTECTION FOR POWER LINES
Original Filed Sept. 7, 1944  5 Sheets—Sheet 2

INVENTOR.
CARL SCHINDLER
BY
Arthur R. Woofock
ATTORNEY

Aug. 7, 1951  C. SCHINDLER  2,563,136
SYSTEM OF PROTECTION FOR POWER LINES
Original Filed Sept. 7, 1944  5 Sheets-Sheet 3

INVENTOR.
CARL SCHINDLER
BY
Arthur R. Woolpock
ATTORNEY

Aug. 7, 1951    C. SCHINDLER    2,563,136
SYSTEM OF PROTECTION FOR POWER LINES
Original Filed Sept. 7, 1944    5 Sheets-Sheet 4
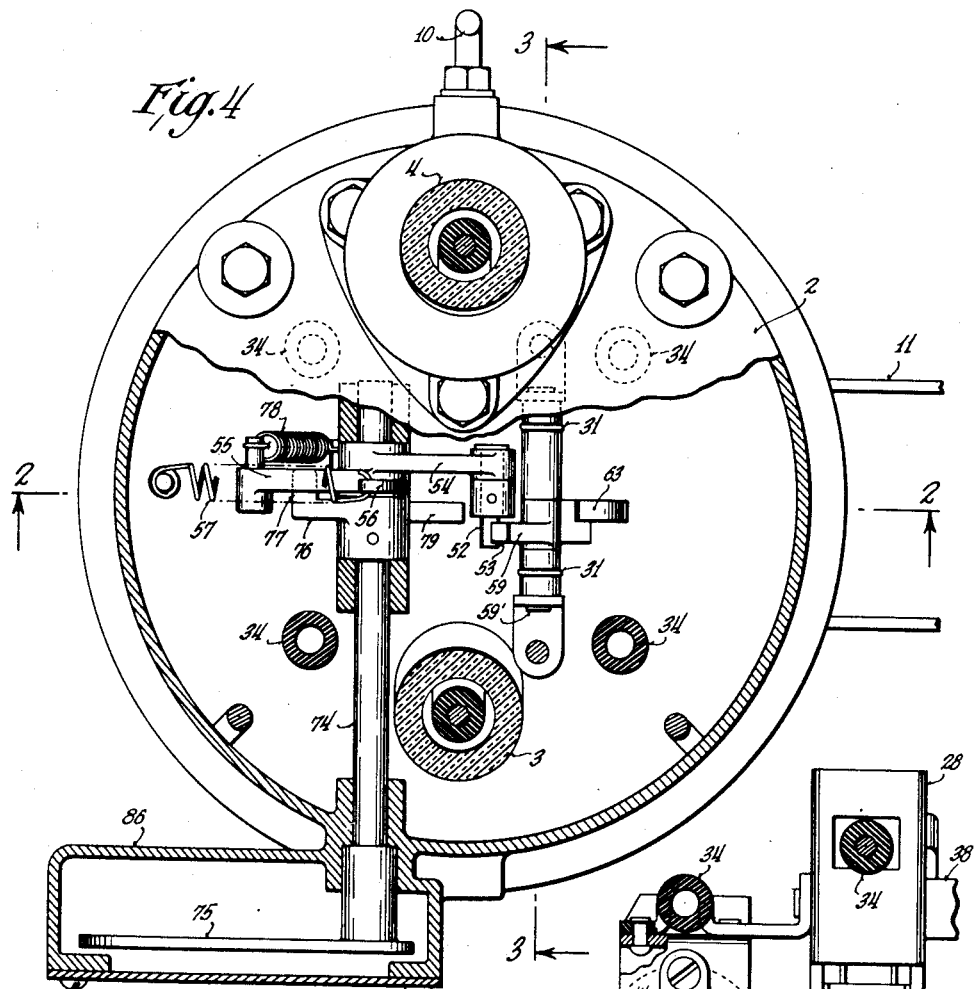
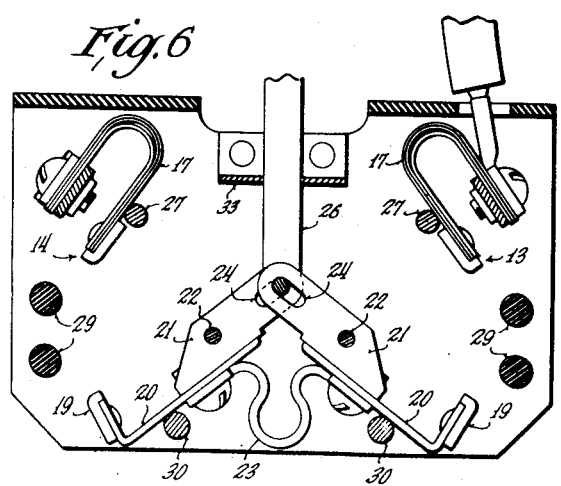
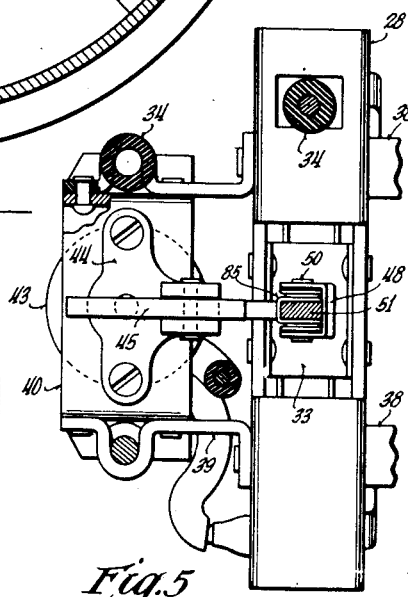
INVENTOR.
CARL SCHINDLER
BY
ATTORNEY.

Aug. 7, 1951 C. SCHINDLER 2,563,136
SYSTEM OF PROTECTION FOR POWER LINES
Original Filed Sept. 7, 1944 5 Sheets-Sheet 5
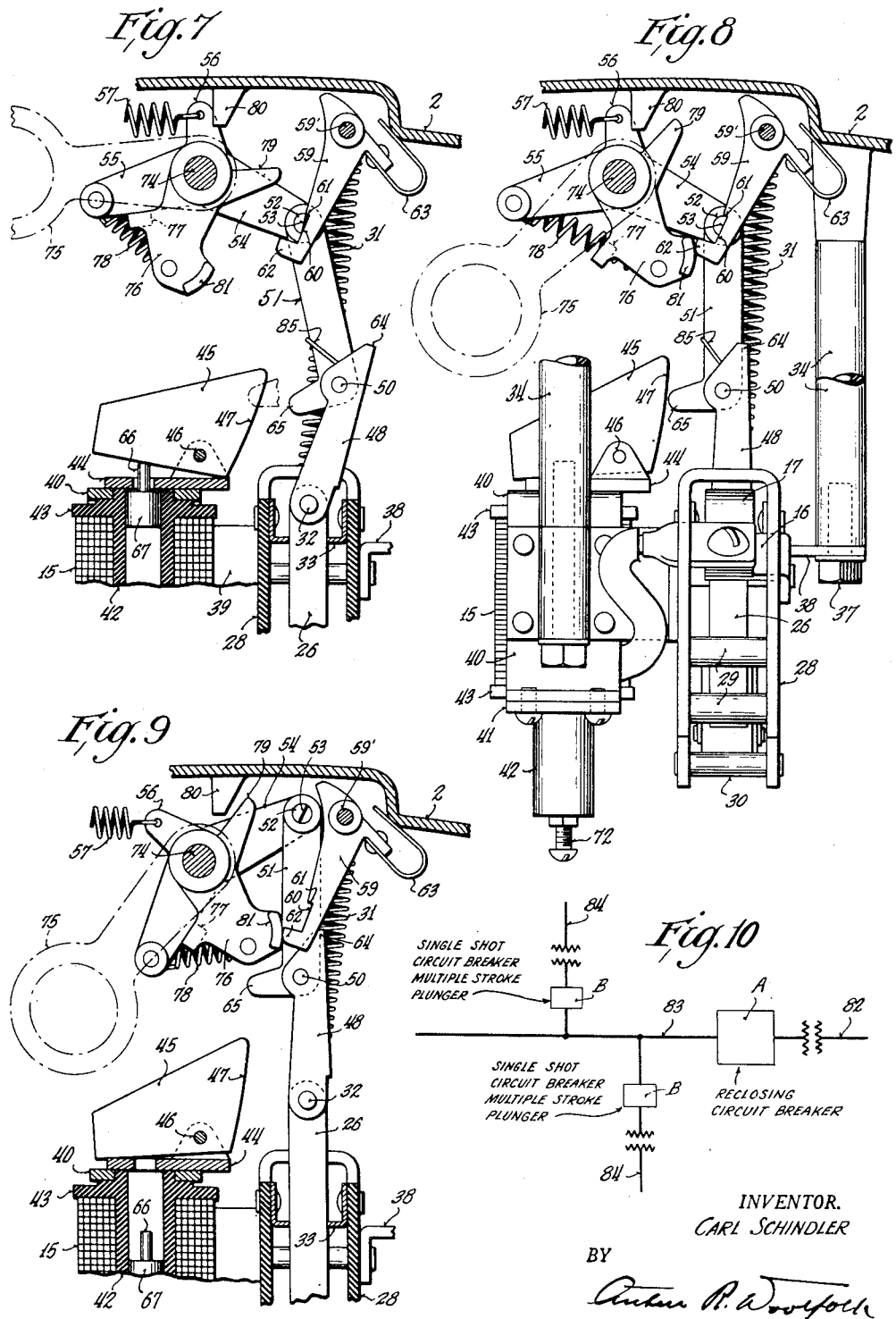
INVENTOR.
CARL SCHINDLER
BY
Arthur R. Woolfolk
ATTORNEY.

Patented Aug. 7, 1951

2,563,136

UNITED STATES PATENT OFFICE 2,563,136

SYSTEM OF PROTECTION FOR POWER LINES

Carl Schindler, Wauwatosa, Wis., assignor to McGraw Electric Company, a corporation of Delaware Original application September 7, 1944, Serial No. 552,998, now Patent No. 2,515,530, dated July 18, 1950. Divided and this application December 1, 1948, Serial No. 62,934

2 Claims. (Cl. 175—294)

This invention relates to a system of protection for power lines.

This application is a division of applicant's copending application Serial No. 552,998, filed September 7, 1944, for Electromagnetic Stepping Trip, which is now Patent No. 2,515,530 of July 18, 1950, assigned to the same assignee as the present application.

Objects of this invention are to provide a system of protection in distribution systems in which a relatively inexpensive circuit breaker is supplied for each branch line and is backed up or preceded by a repeating or reclosing circuit breaker so related to the individual circuit breakers that each branch line has, in effect, the benefit of a reclosing circuit breaker but without entailing the expense of a reclosing circuit breaker for each branch line, in which the individual circuit breaker is arranged to operate two or more times without opening the branch line while allowing the main reclosing circuit breaker to open, but which nevertheless opens the branch line if the fault persists in such branch line, the main reclosing circuit breaker reestablishing service for all of the remaining branch lines, the faulty branch line remaining open.

Further objects are to provide a system of protection for power lines which utilizes a circuit breaker which has means arranged to respond to an overload condition, but which will not cause the circuit breaker to open unless it has responded to at least two successive overloads occurring with sufficient rapidity, the device being arranged to reset itself if the fault clears up after only one operation of the overload responsive means.

In greater detail, further objects are to provide a system of protection for power lines which utilizes a circuit breaker in which an electromagnetic means responds to an overload condition and pumps oil or other liquid into a trip means without opening the circuit breaker, in which the trip means is moved a predetermined distance for the first operation of the electromagnetic means, and on a succeeding operation of the electromagnetic means, for instance the second operation, will trip the circuit breaker, the trip means being arranged to settle back to its initial position, if there is only one operation of the electromagnetic means, thus resetting itself.

An embodiment of this invention is shown in the accompanying drawings, in which:

Figure 4 is a top plan view with parts broken away and parts in section, such view showing the upper portion of the mechanism and omitting the lower portion thereof for the sake of clearness.

Figure 5 is a sectional view on the line 5—5 of Figure 2.

Figure 6 is a sectional view corresponding to the lower portion of Figure 3 and showing the parts in open position.

Figure 7 is a fragmentary view showing the parts in the position they assume just after the circuit breaker has started to automatically open.

Figure 8 is a fragmentary view corresponding to Figure 7 but showing the handle just prior to the completion of its manual opening motion.

Figure 9 is a view corresponding to Figure 7 showing the position of the parts after the circuit breaker has been opened either manually or automatically.

Figure 10 is a block diagram showing the manner in which the circuit breaker is employed in a distribution system.

Figure 1:
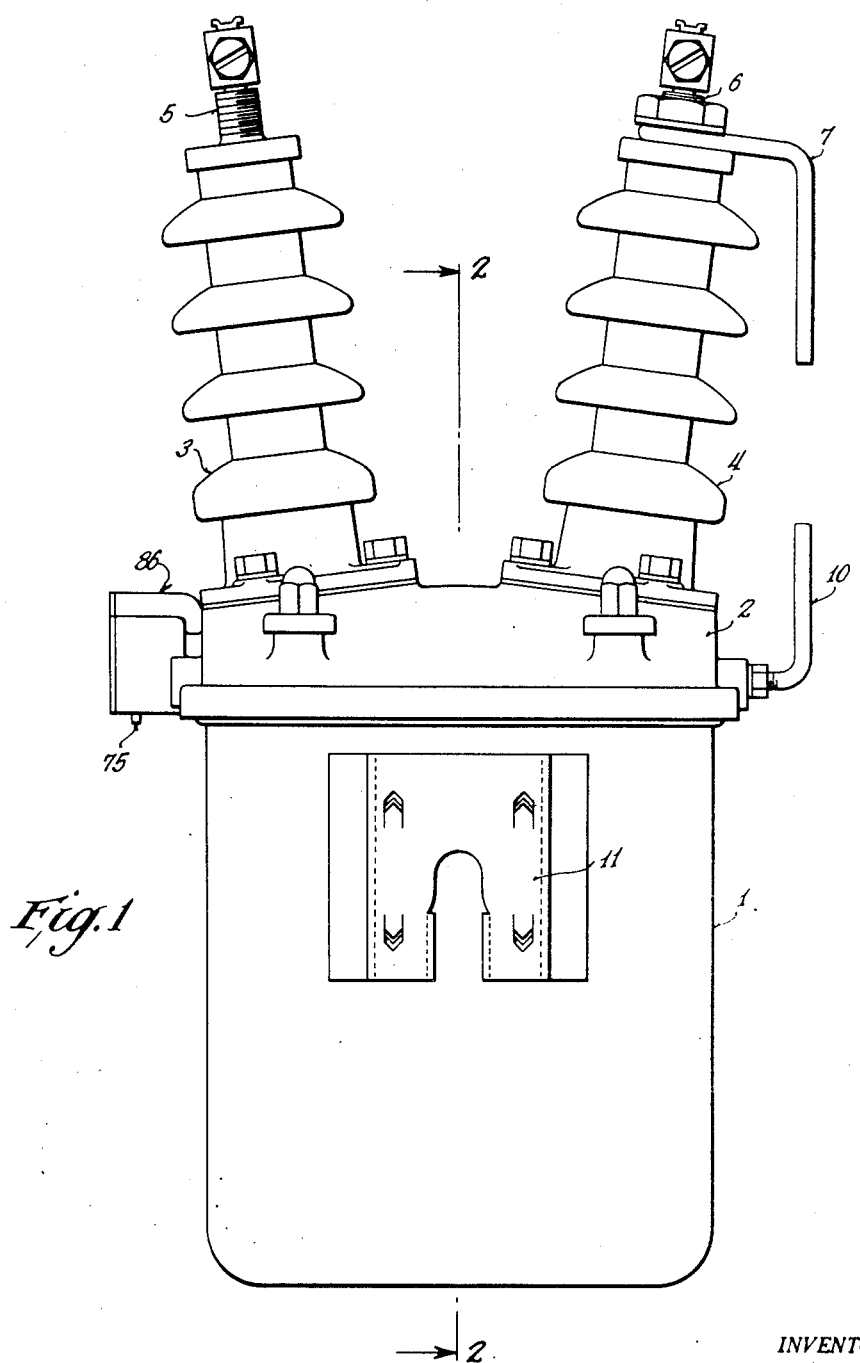
Figure 1 is a side elevation of the circuit breaker employed in the system with a part in section.
Figure 2:
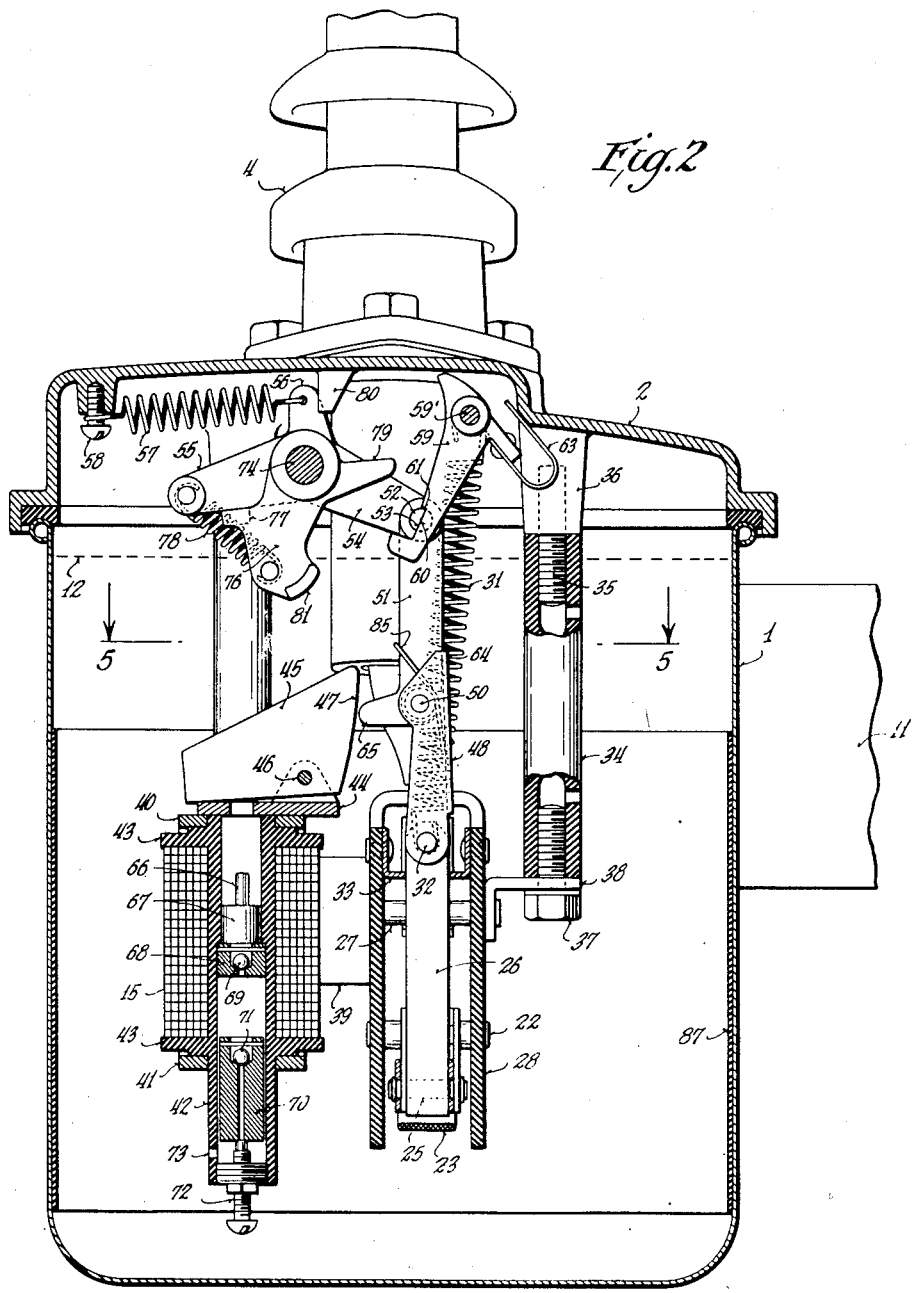
Figure 2 is a sectional view on the line 2—2 of Figures 1 and 4 showing the circuit breaker in closed position.

Referring to the drawings, particularly Figure 1, it will be seen that the circuit breaker is provided with a metal can 1 adapted to contain oil and to house the parts of the circuit breaker. The can is provided with a metal top 2 and with a pair of insulating bushings 3 and 4 which carry terminals 5 and 6, the terminal 5 being the load terminal and the terminal 6 the line terminal. Means, not shown, are provided for grounding the can and top of the circuit breaker. The can is held to the top in the manner shown or in any suitable manner and preferably a gasket as shown in section in Figure 2 is interposed between the can and the top.

A simple type of non-quenching spark gap such as formed by the electrodes 7 and 10 between the line 6 and the metal top of the can may be used. As will be apparent as the description proceeds, any follow through current would be interrupted by the reclosing circuit breaker indicated at A in Figure 10 and described in detail hereinafter. The can 1 is provided with any suitable type of bracket, as shown at 11, whereby it may be secured to a support not shown. As will be seen from Figures 2 and 3, the insulating bushings 3 and 4 extend downwardly through the top of the can and project below the oil level indicated at 12.

Figure 3:
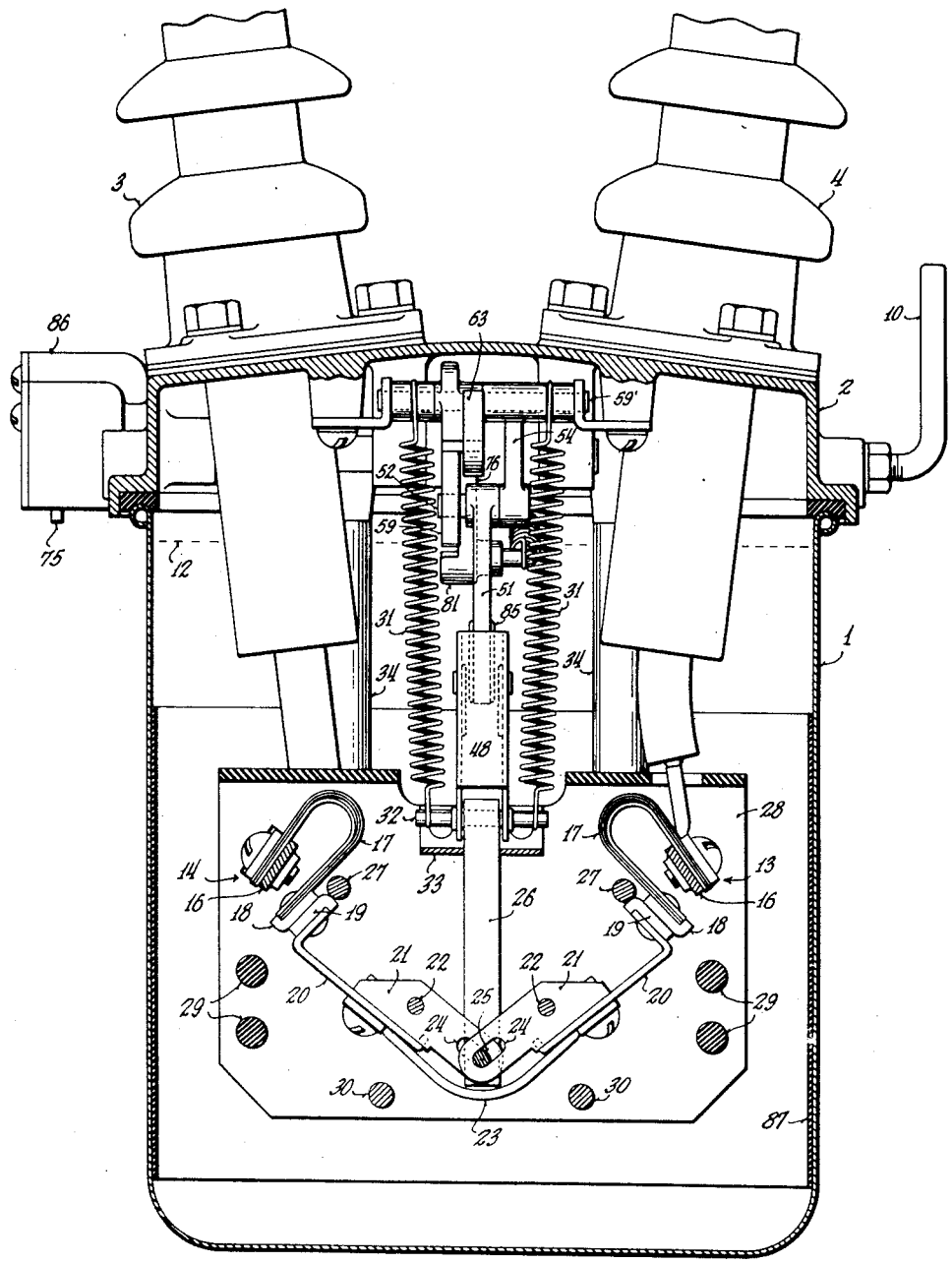
Figure 3 is a sectional view on the line 3—3 of Figure 4 showing the circuit breaker in closed position.

The terminal 6 is connected to one of the stationary contacts indicated generally by the reference character 13 in Figure 3. The other stationary contact indicated generally by the reference character 14 in Figure 3 is connected to one side of a solenoid 15, the other side of which is connected to the terminal 5. The stationary contacts 13 and 14 are rigidly attached to rigid supporting portions 16 and include resilient U-shaped conducting members 17 terminating in contact members 18 which, as shown in Figure 3, are provided with upwardly turned end portions abutting the ends of the U-shaped resilient members 17 and also forming a rounded outer face. Similar types of movable contact members 19 are carried by the movable contact arms 20. The contact arms 20 are rigidly secured to channel-shaped metal members 21 pivoted as indicated at 22 and joined by means of a flexible conductor 23. The channel members 21 are provided with overlapping arms which are slotted as indicated at 24 and receive a pin 25 carried by a slide bar 26 formed of insulating material.

It is to be noted from Figures 3 and 6 that metal pins 27 are provided which act as stops for the movable contacts as shown in Figure 3 and for limiting the motion of the stationary contacts as shown in Figure 6. The movable and stationary contacts are carried in an inverted channel-shaped housing 28 formed of insulating material and open at its sides and lower portion and spaced by means of a plurality of insulating pins 29, such pins acting also as insulating baffles to aid in the suppression of the arc during opening of the circuit breaker, it being noted that the housing 28 constitutes an arc chute and that there is a magnetic blow-out action due to the fact, as will be seen from Figure 3, that the circuit leading through the movable and stationary contacts constitutes in effect a loop which tends to enlarge at the time the circuit breaker is open, thus blowing the arc outwardly at opposite sides and against the insulating spacer pins 29. The arc chute 28 is preferably formed integral throughout and its lower portion is held against opening outwardly by means of metal pins 30 whose ends are reduced and are riveted over in a well known manner. The pins 30 also act as stops to limit the opening motion of the movable contacts, as shown in Figure 6, and consequently act as stops to limit the upward motion of the insulating slide bar 26.

The insulating slide bar 26 is permanently biased upwardly towards switch open position by means of a pair of springs 31, see Figure 3, whose lower ends are attached to a pin 32 secured to the upper end of the slide bar 26, the upper ends of the springs being attached to a transverse pin 59'. The slide bar is guided by means of a slotted U-shaped metal plate 33 rigidly attached to the arc chute or insulating housing 28.

It is to be noted that the insulating housing is rigidly carried by means of a plurality of downwardly extending tubular insulating members or pillars 34 whose upper ends are attached by means of threaded pins 35 to bosses 36 formed integrally with the cover 2 and whose lower ends are attached by means of screws 37 to a pair of brackets 38 rigidly attached to the arc chute or insulating housing 28 on one side thereof, see Figure 2, and to a pair of outwardly looped fiber supporting members 39, see Figure 5, which support the solenoid and which are attached to the magnetic frame or yoke 40 of the solenoid and to the insulating housing or arc chute 28. The brackets 38 are preferably integral with the supports 16. The tubular insulating members are provided with upper and lower apertures so that they will be filled with oil to thereby increase the insulation between the upper and lower ends thereof.

The solenoid construction, it will be seen from Figures 2, 5 and 8, is provided with the metal yoke 40 which extends down opposite sides and across the top of the solenoid and which is completed by means of a magnetic transverse bottom portion 41 apertured to permit the passage therethrough of the insulating tube 42 on which the solenoid 15 is wound. If desired, the tube 42 may be made integral with the upper and lower flanges 43 of the solenoid 15. A non-magnetic upper plate 44 is secured to the upper yoke portion of the solenoid and is provided with upstanding ears between which a fiber or other insulating cam like or tripping member 45 is pivotally mounted as indicated at 46. The center of gravity of the tripping member 45 is to the left of the pivot 46, as viewed in Figure 2, so that the tripping member tends to remain in its non-tripping position. It is provided with an outer cam face 47 which is adapted to coact with toggle link mechanism hereinafter described.

The lower end of the lower link 48 of a toggle link mechanism is pivoted by means of the pin 32 to the insulating slide bar 26. This lower link is composed of channel-shaped metal and its upper end is pivoted by means of the pin 50 to the lower end of the upper metal link 51 of the toggle link mechanism.

The upper end of the upper link 51 of the toggle link mechanism rigidly carries an upper pin 52 which is cut across along a diameter to provide a flat face 53, as shown in Figures 2, 7, 8 and 9. The pin 52 is pivotally carried by a rock arm 54 which is integral with an oppositely projecting rock arm 55 and also integral with an upwardly extending ear 56 to which one end of a spring 57 is attached, the other end of the spring being attached as indicated at 58 in Figure 2 to the cover 2. It is to be noted that the springs 31 which urge the slide bar 26 upwardly and the spring 57 both act in the same sense, that is to say, they both act in a manner tending to open the circuit breaker. Upward motion of the pin 52 is normally prevented by means of the latch lever 59 pivoted on the pivot pin 59', see Figures 2, 3, 7 and 8, suitable spacing sleeves being provided on the pin 59', as shown in Figure 3. The latch lever 59 is provided with a flat face 60 normally in contact with the flat face 53 of the pin 52 and with an upper shoulder 61 against which the remaining part of the cut away portion of the pin 52 normally bears, as shown particularly in Figure 8. It is to be noted also that the latch lever 59 is provided with a projecting finger 62 and is spring urged by means of the leaf spring 63 in a clockwise direction.

Normally the toggle link mechanism composed of the levers 48 and 51 is in a slightly over-center position so that the center of the intermediate pin 50 is slightly to the left of the line joining the center of the pins 32 and 52, see Figure 2. The toggle link mechanism tends to collapse to the left under the influence of the springs 31 but is prevented from so doing by means of the overhanging portion 64 of the channel-shaped link 48 which overhanging portion bears against the side of the link 51. The link 51, it is to be noted from Figures 2, 7, 8 and 9, is provided with a projecting foot 65 which is located in close proximity to the cam face 47 of the tripping member 45 and is adapted to be pushed to the right as viewed in Figure 2 when the tripping member is rocked to the right.

The tripping member is rocked to the right when the non-magnetic projecting pin 66 of a non-magnetic plunger 67 is raised to the position shown in Figure 7. The plunger or piston 67 constitutes a counting or cumulative piston, as will be seen hereinbelow. The non-magnetic plunger 67 normally rests upon a stationary partition member 68 formed of brass and seated against shoulders in the tube 42, as shown in Figure 2. This partition member 68 is provided with a passage therethrough normally closed by an upwardly opening ball check valve 69. Within the lower portion of the tube 42 a magnetic plunger or armature 70 is normally positioned. This magnetic plunger is provided with a passage therethrough which is normally closed by means of an upwardly opening ball check valve 71. The initial position of the plunger 70 is adjustable and is controlled by means of the adjustable screw 72. The plungers 67 and 70 are freely slidable in the tube 42 and an opening 73 is formed in the lower portion of the tube 42 below the magnetic plunger 70. When an overload occurs, the magnetic plunger 70 is drawn upwardly and pumps a measured quantity of oil into the upper portion or upper cylinder of the tube 42 above the partition 68 and the non-magnetic plunger 67 is, therefore, raised to a predetermined position insufficient to actuate the trip member 45. Thus for the first overload no tripping occurs. The purpose of this will be explained hereinafter. When the circuit is interrupted by means hereinafter described, the plunger 70 will immediately settle back to its initial position, as shown in Figure 2, as there is a free flow of oil upwardly past the check valve 71. The plunger 67 has a very slow settling action as compared with the plunger 70. When the second overload occurs, the plunger 70 will make a second stroke upwardly and pump another measured quantity of oil into the upper cylinder and cause the non-magnetic plunger 67 and its projection 66 to actuate the trip member 45 and trip the circuit breaker to open position. However, if the second overload does not occur within a predetermined time, depending upon the settling time of the plunger 67, the tripping of the circuit breaker will not occur. The purpose of this sequential action will be explained in detail hereinafter.

The cam surface 47 of the tripping member 45 is so contoured with reference to the foot 65 of the upper link 51 of the toggle link mechanism that it is in close proximity to the foot portion 65 during the final portion of the closing motion of the circuit breaker so as to allow the circuit breaker to open even during the closing motion if an overload exists.

One form of condition responsive means responsive to overload conditions has been shown but it is to be distinctly understood that other types of condition responsive means responsive to other conditions could be employed.

A rock shaft 74 extends from the interior to the exterior of the cover 2 and is carried in suitable bearings formed integrally with the cover, as indicated in Figure 4. The integrally formed rocking levers 54 and 55 are loosely pivotally mounted on the rock shaft 74. At its outer end the rock shaft 74 rigidly carries an eyeleted manipulating handle 75, see Figure 4. A short lever 76 is rigidly secured to the rock shaft 74 and is located in close proximity to the lever 55 and is provided with a laterally extending lug 77 located below the lever 55. A spring 78, see Figure 2, is interposed between the levers 55 and 76 and normally holds the lug 77 in contact with the lever 55, as shown in Figure 2. The lever 76 is provided with a projecting finger 79 which is adapted to engage a stop 80, see Figure 2, to limit downward rocking motion of the handle. The lever 76 is also provided with a laterally projecting tripping portion 81, see Figures 2 and 8, which is adapted to engage the finger 62 of the latch lever 59 when the handle is pulled downwardly. The engagement between the projecting portion 81 of the lever 76 and the finger 62 of the latch lever 59 is just beginning in Figure 8.

The details of the mechanical operation of the circuit breaker will be given hereinafter. It is to be noted at this point, however, that the circuit breaker is adapted to be used in a system in which a repeating self-closing circuit breaker is positioned ahead of the circuit breaker forming the subject matter of this invention. For instance, as shown in Figure 10, a main line 82 leads to an automatic reclosing circuit breaker A which may be of any suitable type, for instance as shown in the copending application of William D. Kyle, Jr., and Carl Schindler, Serial No. 396,850, filed June 6, 1941, for Automatic Reclosing Circuit Breakers, now Patent No. 2,477,067 of July 26, 1949. A supply line 83 extends from the repeating self-closing circuit breaker A and a plurality of branch lines 84 lead from the main supply line 83. A circuit breaker constructed in accordance with the disclosure of this invention and indicated by the reference character B is interposed in each of the branch lines. Each of these branch lines may supply a single customer for instance.

Assume that a fault occurs in one of the branch lines 84. The magnetic plunger 70, see Figure 2, is suddenly raised and pumps a measured quantity of oil beneath the tripping piston 67, the piston 67 acting in the capacity of a cumulative piston as hereinabove described and being ineffective to trip the circuit breaker on the first stroke of the magnetic plunger 70. The automatic circuit breaker A is so arranged that it opens the circuit in the main line 83. The same minimum current requirement obtains for both the circuit breakers A and B. It is within the province of this invention to so construct the circuit breakers that the circuit breaker B requires slightly more current for actuating the pumping magnetic plunger 70, see Figure 2, than that required to open the circuit breaker A though it is preferable to have the current requirements approximately the same for the circuit breakers A and B, the circuit breaker B in all cases responding to not less than the current required to operate the circuit breaker A. It is to be understood that the magnetic plunger 70 responds very quickly—faster than the opening of the circuit breaker A. If the fault has cleared by the time the delayed action self-closing circuit breaker A has again closed the circuit, nothing further will occur, the plunger 70 having immediately settled back as there is a free passage of oil upwardly through the plunger for the down stroke of the plunger 70. The plunger 67, however, remains in its elevated position for a predetermined length of time and slowly settles down. After a predetermined interval of time the plunger 67 will arrive at its initial position.

On the other hand, if the fault in the line 84 had persisted, the plunger 70 will again make a quick up stroke when the circuit breaker A closes. This up stroke of the plunger 70 occurs prior to the opening of the circuit breaker A and pumps a measured quantity of oil beneath the already partially raised piston 67 and causes the piston to actuate the tripping member 45 and thus trip the circuit breaker B open. This action of the circuit breaker B is so rapid that the circuit breaker A has not had time to again open.

It is to be understood that although the circuit breaker forming the subject matter of this invention has been described as tripping after two strokes of the magnetic plunger 70, it is nevertheless to be understood that the construction may be so arranged as to cause the circuit breaker to trip open after any given number of operations greater than two of the plunger 70, see Figure 2.

The details of the mechanical operation of the circuit breaker will now be given. Assuming that an overload has occurred at least twice in succession in fairly rapid sequence and that as a result the tripping member 45 has been moved to tripping position, as shown in Figure 7, the tripping member in rocking from the position shown in Figure 2 to the position shown in Figure 7 breaks the toggle link mechanism composed of the members 48 and 51 and thus initiates collapse of the toggle. The initial portion of the collapsing motion of the toggle is shown in Figure 7. The springs 31 are now effective to produce collapsing motion of the toggle. As the upper link 51 of the toggle rocks as indicated in Figure 7, the lower edge at the cut away portion of the pin 52 pushes the latch lever 59 to the right and the upper edge at such cut away portion disengages itself from the shoulder 61 of the latch lever 59 and thus frees the double armed rock lever 54 and 55. The spring 57 is now effective and rocks the lever 54, 55 in a counterclockwise direction from the position shown in Figure 7 to the position shown in Figure 9. As previously described, the stop pins 30, see Figures 3 and 6, limit the motion of the arms 20 and consequently limit the upward travel of the slide bar 26. It is obvious, therefore, that the rocking lever 54, 55 straightens the toggle 48, 51. A small spring 85 is loosely coiled about the pin 50 and opposite ends thereof bear against the links 48 and 51 of the toggle link and tend to straighten the toggle link and move it slightly past dead center to the position shown in Figure 9. The spring 85 shows in Figures 2, 7, and 8 but is hidden by the parts in the position shown in Figure 9.

As the arm 55 of the rock lever moves in a counterclockwise direction, it bears against the lug 77 of the short lever 76 and rocks such short lever, and consequently the rock shaft, in a counterclockwise direction, the lever 76 and the rock lever 54, 55 moving as a unit. The rocking of the rock shaft 74 causes the handle 75 to move from its hidden position within the housing 86, see Figure 4, downwardly to an exposed or indicating position, as shown in dot and dash lines in Figure 9, thus giving an indication that the circuit breaker is open.

The circuit breaker is readily reset by pushing upwardly on the handle 75 by means of a switch stick. The lug 77 of the lever 76 engages the lever 55 and rocks the lever 54 downwardly, thus closing the circuit breaker and causing the pin 52 carried by the upper link 51 to again be latched by the latch lever 59.

When it is desired to manually open the circuit breaker, the operating handle 75 is engaged by a switch stick and is pulled downwardly. This downward motion of the handle 75 rocks the rock shaft 74 and consequently rocks the lever 76 against the action of the spring 78, the floating or rock lever 54, 55 remaining in its initial position, as shown in Figure 8, until the trip portion 81 of the lever 76 engages the finger 62 of the latch lever 59, as shown in Figure 8, and pushes such lever to the right, thus freeing the pin 52 and allowing quick opening of the circuit breaker under the influence of the springs 31, 57 and 78 without collapse of the toggle link mechanism as all of these springs act in the same sense tending to open the circuit breaker during manual opening. The parts are shown in the position where the trip portion 81 is just engaging the finger 62 of the latch lever 59, in Figure 8. Continued downward motion of the handle causes disengagement of the latch lever 59 from the pin 52, as described above. The final position of the parts is shown in Figure 9.

It will be seen that a simple and reliable type of circuit breaker has been provided by this invention which is economical to build and which is certain in its operation. It will be seen that when the circuit breaker is tripped automatically on a recurring overload, the toggle link mechanism collapses. Collapse of the toggle link mechanism is followed by the automatic straightening of the toggle link mechanism. This gives a very quick opening stroke to the circuit breaker. However, when the circuit breaker is manually opened, it also has a very quick opening stroke as the spring 57 rocks the rock lever 54, 55 from the position shown in Figure 7 to the position shown in Figure 9 and opens the circuit breaker without collapse of the toggle link mechanism, the springs 78 and 31 assisting in this operation.

It will be seen further that the springs act directly on the parts with which they are associated and do not act through the agency of cams or other means. It will also be seen that the moving parts of the circuit breaker may be made very light and consequently will have very little inertia, thus giving a quick action to the circuit breaker whether manually or automatically opened.

It is to be noted particularly with reference to the springs that they do not oppose each other but each is wholly effective to produce the operation for which it is intended without opposition of any other spring. This is particularly true of the springs 31 and 57. The spring 78 normally holds the handle 75 in its uppermost or hidden position and holds the lug 77 of the lever 76 in contact with the lever 55, the spring 78, however, yielding when the circuit breaker is being manually opened as indicated in Figure 8 and finally bringing the lever 55 again into contact with the lug 77 in the final open position as shown in Figure 9 after manual operation. During automatic operation the floating lever 54, 55 and the short lever 76 rock as a unit to the position shown in Figure 9. It is to be noted that the springs 31, 57 and 78 are all operative in the same direction. The spring 78 aids in the opening motion of the circuit breaker when manually operated. The spring 78 normally holds the handle in its uppermost position and returns it to that position should it be moved partially downward and thus prevents the handle from remaining in an intermediate position.

It will be seen further that all of the effective parts of the circuit breaker are freely removable from the can 1 as it is merely necessary to remove the cover 2 after removal of the securing means holding the cover in place so that the parts of the circuit breaker may be readily inspected or repaired as desired. It is preferable to provide an insulating lining 87 for the can 1 which lining occupies the interior lower portion of the can.

By means of this invention it is possible to have the individual branch lines protected by a simple type of circuit breaker as hereinabove described and at the same time have the benefits of the more expensive automatic reclosing type of circuit breaker so that although a single shot circuit breaker is employed on the branch line, nevertheless service is not permanently discontinued on the branch line until the branch line has been automatically opened at least two times. In addition to this, service on the main line or supply line is not discontinued permanently even though a permanent fault occurs on a single branch line. Instead the service from the supply line is only temporarily interrupted and ultimately the affected branch line is disconnected from the supply line and the service to other customers on other branch lines supplied from the supply line is continued.

Although this invention has been described in considerable detail, it is to be understood that such description is intended as illustrative rather than limiting, as the invention may be variously embodied and is to be interpreted as claimed.

I claim:

1. In a system of electrical distribution, a main line, a supply line, an automatic reclosing circuit breaker between the main line and the supply line, at least one branch line, and a single shot circuit breaker connected between the supply line and the branch line, said single shot circuit breaker having switch means biased towards open position, latch means normally holding said switch means in closed position, overload responsive means including a movable member movable from an initial position to an advanced position while an overload exists and cumulative means having a latch releasing member advanced in a step by step manner by said overload means while the movable member of said overload means is advancing at the occurrence of each overload and engaging said latch means at its final advanced position to thereby trip said latch during the occurrence of the final overload for which said single shot circuit breaker responds.

2. In a system of electrical distribution, a main line, a supply line, an automatic reclosing circuit breaker between the main line and the supply line, at least one branch line, and a single shot circuit breaker connected between the supply line and the branch line, said single shot circuit breaker having switch means biased towards open position, latch means normally holding said switch means in closed position, overload responsive means including a movable member movable from an initial position to an advanced position while an overload exists, and cumulative means having a latch releasing member advanced in a step by step manner by said overload means while the movable member of said overload means is advancing at the occurrence of each overload and engaging said latch means at its final advanced position to thereby trip said latch during the occurrence of the final overload for which said single shot circuit breaker responds, said single shot circuit breaker being faster in opening operation for any overload to which it responds that said automatic reclosing circuit breaker.

CARL SCHINDLER.

REFERENCES CITED

The following references are of record in the file of this patent:

UNITED STATES PATENTS

| Number | Name | Date |
|---|---|---|
| 1,982,986 | Garlington | Dec. 4, 1934 |
| 2,177,774 | Jackson | Oct. 31, 1939 |
| 2,337,713 | Garlington | Dec. 28, 1943 |
| 2,387,372 | Watkins | Oct. 23, 1945 |
| 2,387,373 | Watkins | Oct. 23, 1945 |
| 2,414,786 | Lincks et al. | Jan. 21, 1947 |
| 2,468,498 | Kyle | Apr. 26, 1949 |
| 2,468,851 | Wallace | May 3, 1949 |